(12) United States Patent
Sperry et al.

(10) Patent No.: US 11,047,334 B2
(45) Date of Patent: Jun. 29, 2021

(54) INTAKE CHAMBER AIR DIFFUSING FEATURE IN AN OPPOSED-PISTON ENGINE

(71) Applicant: ACHATES POWER, INC., San Diego, CA (US)

(72) Inventors: Robert G. Sperry, Columbus, IN (US); James R. Shaw, Columbus, IN (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 16/681,430

(22) Filed: Nov. 12, 2019

(65) Prior Publication Data

US 2021/0140389 A1    May 13, 2021

(51) Int. Cl.
    *F02F 1/42* (2006.01)
    *F02B 25/08* (2006.01)

(52) U.S. Cl.
    CPC ............ *F02F 1/4235* (2013.01); *F02B 25/08* (2013.01)

(58) Field of Classification Search
    CPC ........ F02F 1/4235; F02F 1/4242; F02F 1/425; F02F 1/4257; F02F 7/0009; F02F 1/186; F02B 25/02; F02B 25/08
    See application file for complete search history.

(56) References Cited

U.S. PATENT DOCUMENTS

| | | | |
|---|---|---|---|
| 4,119,067 A | 10/1978 | Aldrich et al. | 123/52 MB |
| 7,055,513 B1 | 6/2006 | Boveia | 123/590 |
| 8,006,497 B2 | 8/2011 | Nolcheff et al. | 60/751 |
| 2005/0133009 A1 | 6/2005 | Rowells et al. | 123/456 |
| 2015/0059340 A1* | 3/2015 | Bandyopadhyay | F02M 35/1045 60/605.1 |
| 2015/0337727 A1 | 11/2015 | Fuqua et al. | F02B 75/282 |
| 2015/0337728 A1* | 11/2015 | Fuqua | F02M 35/10157 60/597 |
| 2020/0182188 A1* | 6/2020 | Choudhary | F02F 7/0007 |

* cited by examiner

*Primary Examiner* — Jacob M Amick

(74) *Attorney, Agent, or Firm* — Terrance A. Meador; Julie J. Muyco

(57) ABSTRACT

An air intake system is provided that supplies charge air to multiple cylinders in an in-line configuration in an uniflow-scavenged, two-stroke opposed-piston engine. The engine is configured such that the intake ports of the cylinders are situated in one intake chamber within the engine block. The air intake chamber includes a feature to balance the mass of air that reaches the intake port of each cylinder in the engine.

28 Claims, 3 Drawing Sheets

INTAKE CHAMBER AIR DIFFUSING FEATURE IN AN OPPOSED-PISTON ENGINE

STATEMENT REGARDING FEDERALLY SPONSORED RESEARCH

This Project Agreement Holder (PAH) invention was made with U.S. Government support under Agreement No. W15KQN-14-9-1002 awarded by the U.S. Army Contracting Command-New Jersey (ACC-NJ) Contracting Activity to the National Advanced Mobility Consortium. The Government has certain rights in the invention.

FIELD

The field relates to the construction of an intake chamber for an opposed-piston engine. In particular, the field pertains to the configuration of features in the intake chamber to improve the distribution of charge air to cylinders in the engine.

BACKGROUND

Uniflow-scavenged, two-stroke opposed-piston engines have airflow needs that differ from those of four-stroke engines, which have exhaust and scavenging strokes in their cycle. In each cylinder of uniflow-scavenged, two-stroke opposed-piston engines as described herein, two pistons move in opposition, along a longitudinal axis of the cylinder, to form a combustion chamber near the center of the cylinder near the end of a compression stroke. Combustion occurs when these pistons attain a minimum volume between their facing end surfaces. These engines have intake and exhaust ports in the cylinder sidewall, spaced-apart along the length of the cylinder, with one end designated as the intake end, and the other as the exhaust end.

The configuration of uniflow-scavenged, two-stroke, opposed-piston engines described herein includes an engine block with an open air intake chamber, or plenum, into which charge air enters from an air handling system. The intake ports of all of the cylinders in the engine are located within the air intake chamber. This configuration is utilized in engines in which a closer cylinder-to-cylinder spacing is desired than might be achieved using an intake manifold. The use of an air intake chamber (or, intake plenum) also allows for a reduction in engine weight and reduction in parts that can wear or fail because an open air intake chamber requires fewer parts than a manifold with runners to each intake port. With the elimination of an intake manifold, an engine may also lose the ability to ensure that a uniform amount of intake or charge air reaches each cylinder. This loss in uniformity may reduce the ability to complete scavenging to a similar degree in all the cylinders. A structure that allows for uniform airflow to each cylinder of a two-stroke, uniflow-scavenged opposed piston engine is provided as an addition to an open intake chamber, or plenum, so that the benefits of such an intake chamber can be maintained while optimizing scavenging.

SUMMARY

An airflow system that includes an open air intake chamber for an uniflow-scavenged, two-stroke opposed-piston engine is described herein. The air intake chamber is formed in a cylinder block of the uniflow-scavenged, two-stroke engine, and the intake ports of all of the cylinders are located in the air intake chamber so that charge air flowing into the air intake chamber passes through the intake ports into the cylinder bores while the engine is operating. The air intake chamber includes at least one air inlet opening through a side of the cylinder block, connecting to the rest of the airflow system. A plurality of support posts are in the air intake chamber, extending from the chamber floor to the ceiling. There is an airflow diffusing structure in the air intake chamber, adjacent to the at least one air inlet opening through the side of the cylinder block. The diffusing structure causes airflow entering into the chamber to undergo diffusion so as to spread out evenly across the chamber such that all intake port openings downstream of the diffusing structure receive substantially equal amounts of fresh charge air mass.

The air intake chamber described herein includes at least one airflow diffusing structure. The airflow diffusing structure is situated in the air intake chamber between an air inlet opening through a side of the cylinder block and all of the intake ports of the cylinders in the air intake chamber. There are apertures along the length of the airflow diffusing structure that are grouped such that the open surface area varies from one end of the airflow diffusing structure closest to the air inlet opening to another end furthest from the air inlet opening. In short, the airflow diffusing structure encourages the charge air to evenly extend along the length of the cylinder block, improving the charge airflow distribution and the scavenging efficiency of the engine.

DETAILED DESCRIPTION

In an uniflow-scavenged, two-stroke opposed-piston engine with a plurality of cylinders an airflow diffusing feature in a charge air chamber (e.g., inlet air plenum) equalizes the airflow to each cylinder so that scavenging at each cylinder can occur with similar efficiency. The feature is an airflow diffusing structure, that is to say a plate, a wall, or similar structure with orifices or apertures which vary along the length of the structure so that the air entering the charge air chamber is diffused and the cylinder nearest the inlet of charge air receives approximately the same amount of charge air per unit time as the cylinder furthest away from the charge air inlet.

Figure 1:
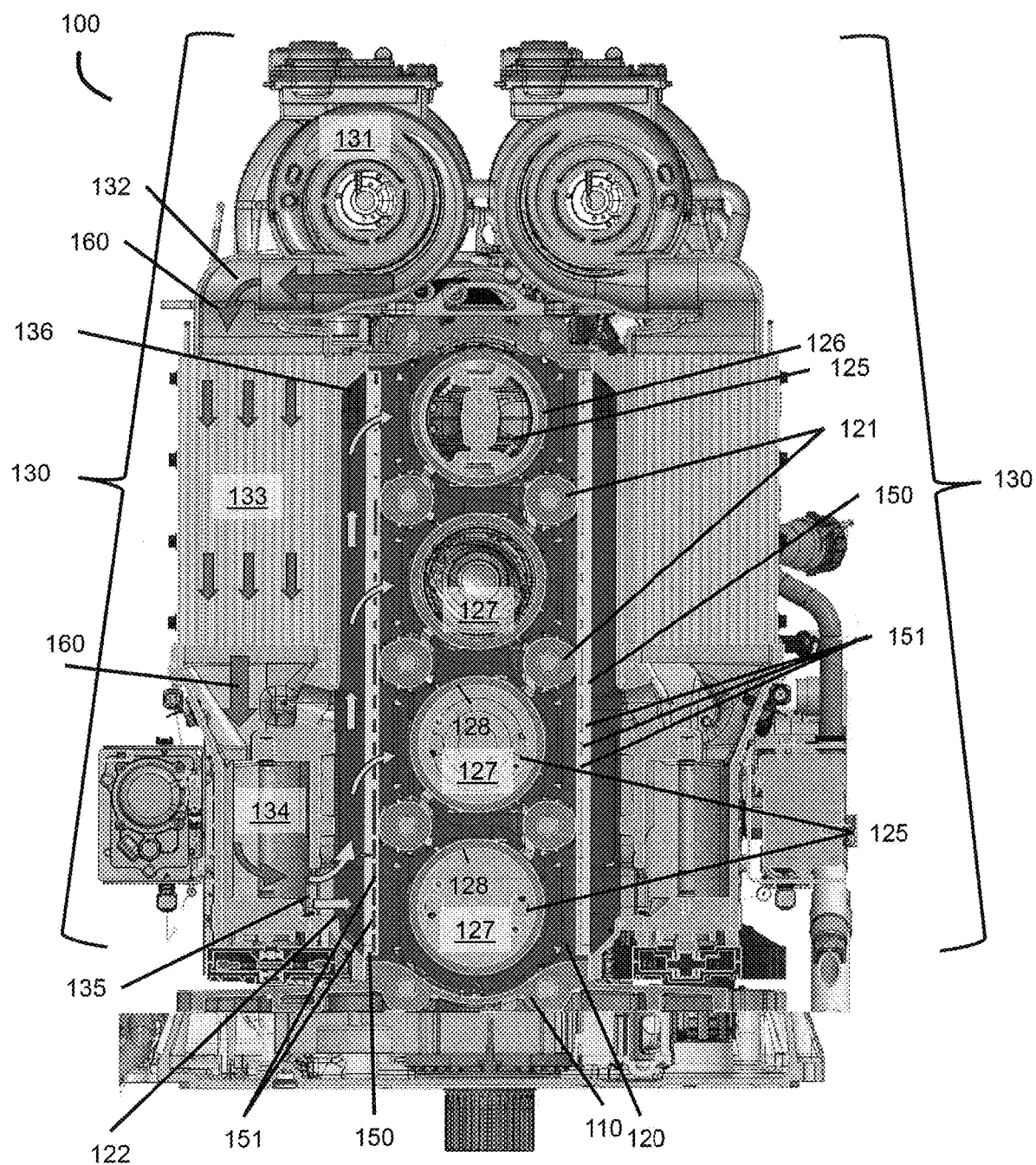
FIG. 1 shows an airflow diffusing structure for an open air inlet chamber in an opposed-piston engine including the path of air mass flow.

FIG. 1 shows an airflow diffusing structure for an open air inlet chamber in an air handling system in an uniflow-scavenged opposed-piston engine 100. The engine 100 includes a cylinder block 110, a charge air or intake chamber 120, cylinders 125, and a set 130 of air handling components disposed along at least one side of the cylinder block 110. Preferably, identical sets 130 of air handling components are disposed along opposite sides of the cylinder block 110. The set 130 of air handling components includes a turbocharger with a compressor 131, a charge air cooler 133, a supercharger 134, as well as connective conduits such as the turbocharger outlet 132 and supercharger outlet 135. The cylinder block 110 houses the intake chamber 120, an exhaust chamber (not shown), and the cylinders 125. Within the intake chamber 120 are situated a portion of each of the cylinders 125, support columns 121, and an airflow diffusing structure 150. The airflow diffusing structure 150 has inlet apertures 151. The inlet apertures 151 may differ from one end of the structure 150 to the other, differing in any of size, shape, and proximity (e.g., density or closeness to an adjacent aperature). Each cylinder 125 includes a bore 127 with a running surface (i.e. bore surface) 128, an intake port, and an exhaust port. The intake and exhaust ports each consist of an array of openings through the cylinder wall. In the case of the intake ports, each intake port allows for fluid communication between the intake chamber 120 and the cylinder bore 127.

The intake chamber 120 is an elongate, open chest, plenum, or gallery inside of the cylinder block 110 with a volume that contains all of the cylinder intake ports. Each and every one of the intake ports of the engine is positioned a common volume in the intake chamber 120 that is shared by all of the intake ports. All of the intake ports receive charge air from the common volume of the intake chamber. The intake chamber 120 is undivided in the sense that it is not partitioned into individual chambers or sub-chambers; there are no individual chambers or sub-chambers that contain the annular intake area of only a single cylinder. The intake chamber 120 can include a first elongate air inlet 122 that opens through a first side of the cylinder block 110. In some implementations, the intake chamber also includes a second elongate air inlet through a second side of the cylinder block 110 that is opposite the first side. Support posts 121 in the intake chamber 120 provide structural support between the floor and ceiling of the intake chamber 120. The support posts 121 can be positioned away from the cylinders 125, abutting, or inwardly of, the air inlets 122. Shaped chest covers 136 external to the cylinder block 110 that cover the air inlets 122 may be formed on or attached to each side of the block that has an air inlet, such as on opposing sides of the block. At least one of the shaped chest covers 136 is in fluid communication with a pipe or conduit for transporting charge air from the air handling system. In FIG. 1, a shaped chest cover 136 connects to the supercharger outlet 135.

The arrows in FIG. 1 indicate the direction of air flow 160 through the engine 100. In use, charge air moves from the turbocharger compressor 131, through the turbocharger outlet 132, to the charge air cooler 133, then to the supercharger 134. As the charge air leaves the supercharger 134 through the supercharger outlet 135, it enters the intake chamber 120 at an air inlet opening 122 through the side of the cylinder block 110. Charge air impinges on the airflow diffusing structure 150 and flows through the inlet apertures 151. Charge air enters the intake chamber 120 from the opposite side of the cylinder block, via a similar airflow pattern, through another airflow diffusing structure 150.

Figure 2:
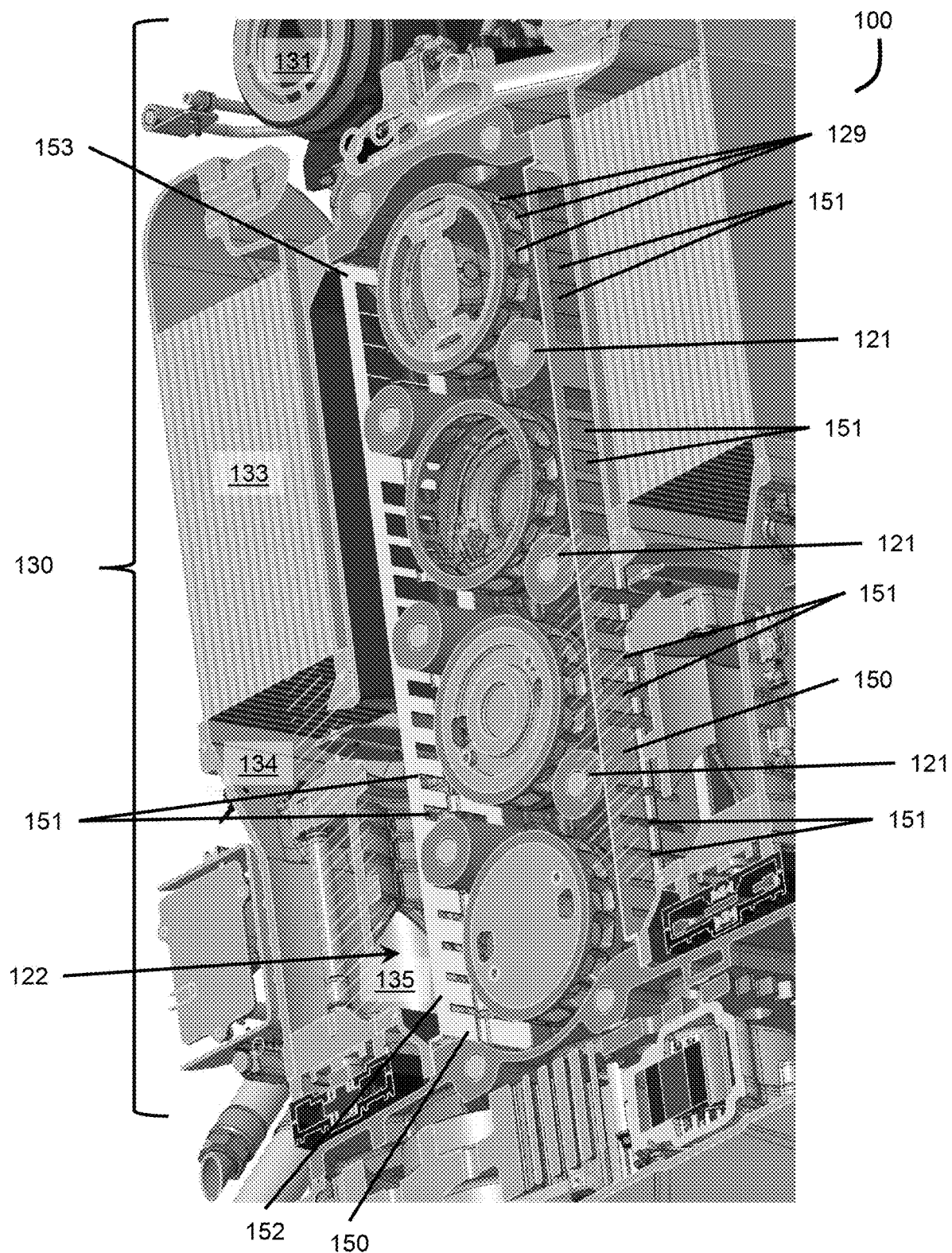
FIG. 2 shows an isometric view of the air inlet chamber of FIG. 1.

FIG. 2 is another view of the engine 100 shown in FIG. 1. In this view, a cut has been taken through the engine 100 at a different location. The location of the cut and the angle in FIG. 2 allows cylinder intake port openings 129 to be seen relative to the air inlet apertures 151 in the airflow diffusing structures 150. The airflow diffusing structures 150 each have an end 152 that is closest to the source of charge air, which in FIGS. 1 and 2 is the supercharger outlet 135, as well as an end 153 that is furthest away from the source of charge air. As can best be seen in FIG. 2, adjacent to each cylinder's intake port there are the same number of air inlet apertures 151. In FIG. 2, there are five apertures 151 in the airflow diffusing structure 150 per cylinder 125, though the number of apertures per cylinder can vary in different implementations. The inlet apertures 151 on the end 152 closest to the supercharger outlet 135 are the narrowest. Each set of inlet apertures 151 becomes increasingly wider. This variation in aperture width, and in turn open surface area, allows for charge airflow to be substantially equal across all of the intake ports in the intake chamber.

Figure 3A:
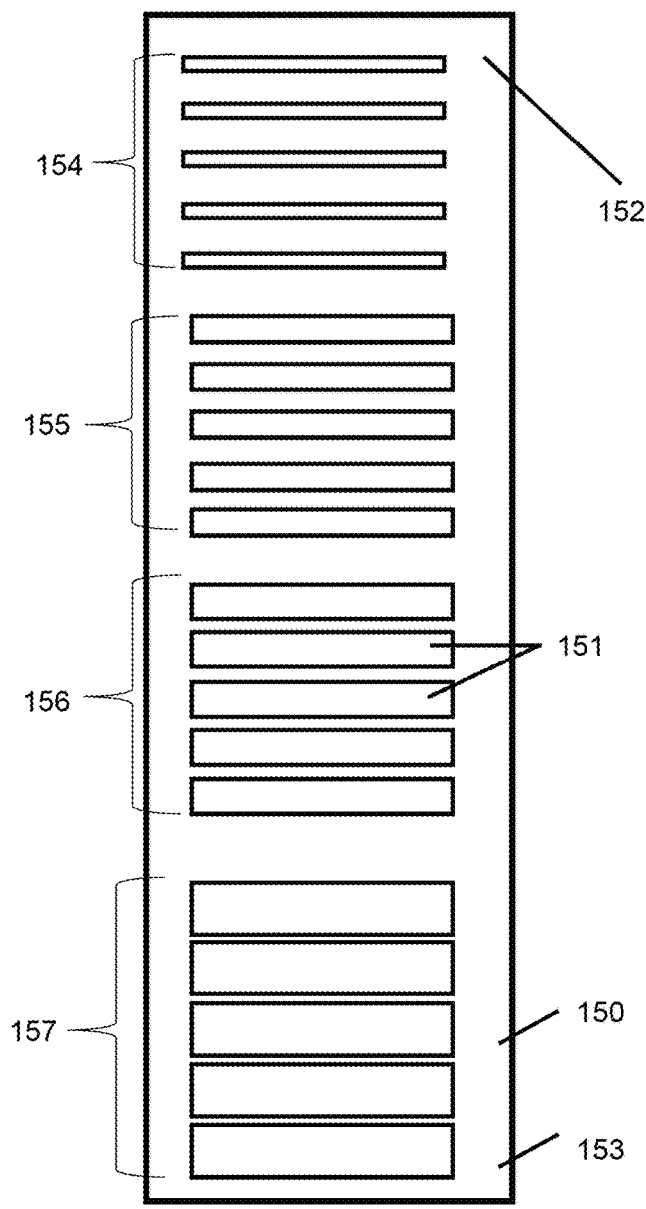
FIGS. 3A and 3B show embodiments of an airflow diffusing structure for an open air inlet chamber in an opposed-piston engine.
Figure 3B:
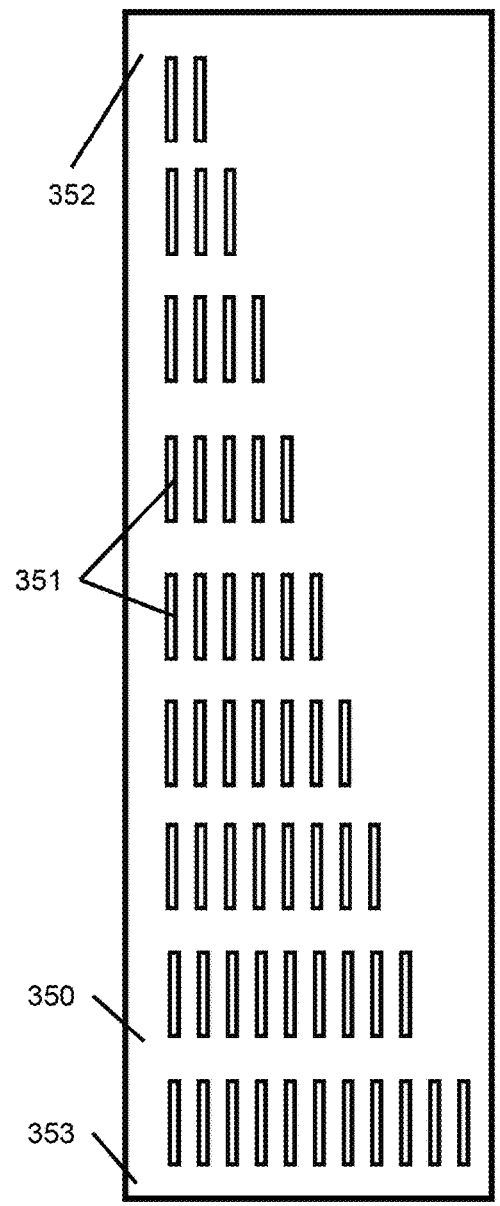

FIGS. 3A and 3B show embodiments of an airflow diffusing structure for use in an open intake chamber of an opposed-piston engine. FIG. 3A shows an airflow diffusing structure 150 similar to that seen in FIGS. 1 and 2. This airflow diffusing structure 150 has a first end 152 that is configured to be closest to the source of charge air in the intake chamber (120 in FIG. 2), as well as a second end 153 that is configured to be furthest away from the source of charge air along the length of the diffusing structure. Inlet apertures 151 gradually increase in height, while remaining constant in width along the length of the airflow diffusing feature 150. The inlet apertures 151 at the first end 152 are most restrictive in the amount of airflow they are configured to admit across the structure 150. There are four groups 154, 155, 156, 157 of inlet apertures 151 in the airflow diffusing structure 150. The first group 154 at the end 152 that is configured to be closest to the source of charge air in the intake chamber is shown with the same number of inlet apertures as the other groupings 155, 156, 157. However, those inlet apertures in the first group 154 are the narrowest on the structure 150. The distance between each inlet aperture 151 in a grouping reduces as the open surface area of each grouping increases. This increase in open surface area in each grouping allows for equalization in the airflow to the cylinders in the intake chamber.

The airflow diffusing structure 350 shown in FIG. 3B has inlet apertures 351 of consistent width and length, but the number of apertures per grouping of apertures, and in turn per cylinder, differs. The orientation of the apertures 351 is also perpendicular to those shown in FIG. 3A (reference number 151 in FIG. 3A). However, like the airflow diffusing structure 150 shown in FIG. 3A, the airflow diffusing structure 350 in FIG. 3B has an end 352 configured to be closest to the source of charge air where the apertures 351 are the most restrictive with respect to the amount of charge air that can pass through the apertures in the airflow diffusing structure 350. Moving away from the source of charge air, the apertures 351 become less restrictive with respect to the amount of charge air that can pass through them. In any configuration, the airflow diffusing structure is configured to equalize the charge airflow to each cylinder, so that per unit time, the same mass of charge air arrives at each cylinder.

The location of one or more airflow diffusing structures in an intake air chamber is such that it is between the cylinders and the point where charge air is introduced into the intake air chamber. The airflow diffusing structure may be situated within 60 mm of any cylinder wall, and alternatively or additionally within 50 mm of any cylinder bore surface. In some implementations, the airflow diffusing structure is adjacent to the support columns while also being between the entry point for charge air and the cylinders.

Though the airflow diffusing structure is shown FIGS. 3A and 3B as a plate, the diffusing structure can be a screen (or a perforated partition or plate) that is a cast feature in a cylinder block that does not use cylinder liners or sleeves, that is to say in an engine of the parent bore type. In a parent bore engine with an airflow diffusing structure, the diffusing screen or partition can be cast with the cylinder block of the same material. The inlet apertures can be cast into the screen and finished with machining, simply cast without further finishing, or can be manufactured entirely by machining into the cast screen. As a cast feature, the diffusing screen may require fewer or no securing fittings to be attached to the cylinder block. Additionally, a cast diffusing screen can perform differently from a diffusing plate inserted into the intake chamber in that it may be more robust, have less fatigue at the junction of the diffusing feature and sidewalls of the intake chamber, and may lead to an overall lighter engine.

The airflow diffusing structure can be a plate that is fabricated separately from the cylinder or engine block and then inserted into the intake chamber when the engine is assembled. The airflow diffusing structure as a plate can be fabricated of any robust material, such as mild steel, an aluminum alloy, or the same material from which the cylinder block is fabricated. A plate can be cast to create an airflow diffusing structure as described herein. Alternatively, a sheet of material formed by casting, extrusion, or milling can be machined with appropriate dimensions for insertion into the intake chamber and with apertures sized and positioned as described above.

In an opposed-piston engine the airflow diffusing structure can be cast directly into the portion of the intake chamber that is part of the cylinder or engine block. Alternatively, the airflow diffusing structure can be cast as a portion of a component that is attached to (e.g., bolted on to) the cylinder or engine block. Such a component may include an integrated intake chest cover external to the cylinder block that covers the air inlets of the intake chamber.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An air handling system for an opposed-piston engine having a cylinder block with a plurality of cylinders aligned in one row, in which each cylinder includes an intake port longitudinally separated from an exhaust port, comprising:
    an open intake chamber in the cylinder block including at least one air inlet opening through the cylinder block;
    all of the cylinder intake ports being contained in the open intake chamber to receive charge air therein; and,
    an airflow diffusing structure adjacent to the at least one air inlet opening;
    wherein the airflow diffusing structure comprises inlet apertures that vary in either number or size along a length of the airflow diffusing structure.

2. The air handling system of claim 1, wherein the inlet apertures are grouped.

3. The air handling system of claim 2, wherein the inlet apertures are all of the same dimension along the length of the airflow diffusing structure, and further wherein each group of inlet apertures has a different number of inlet apertures along the length of the airflow diffusing structure.

4. The air handling system of claim 2, wherein each group of inlet apertures has a constant number of inlet apertures along the length of the airflow diffusing structure, while dimensions of the inlet apertures in each group of inlet apertures vary along the length of the airflow diffusing structure.

5. The air handling system of claim 1, wherein the opposed-piston engine is a parent bore engine, further wherein the airflow diffusing structure is a diffusing screen that is a cast feature in the open intake chamber.

6. The air handling system of claim 1, wherein the opposed-piston engine comprises a plurality of cylinder liners, further wherein the airflow diffusing structure is a plate that is fabricated separately from the cylinder block and inserted into the open intake chamber when the engine is assembled.

7. The air handling system of claim 6, wherein the airflow diffusing structure is a plate that is fabricated from a material that differs from that of the cylinder block.

8. The air handling system of claim 6, wherein the airflow diffusing structure is a plate that is fabricated from a material that is the same as that of the cylinder block.

9. The air handling system of claim 1, wherein the airflow diffusing structure is a diffusing screen that is a cast feature in a component that is bolted onto the cylinder block.

10. The air handling system of claim 9, wherein the component that is bolted onto the cylinder block comprises a shaped cover external to the cylinder block that covers an air inlet of the intake chamber.

11. An open intake chamber in a cylinder block for an uniflow-scavenged, two-stroke opposed-piston engine, the open intake chamber comprising:
    a volume that contains all cylinder intake ports of the opposed-piston engine;
    at least one air inlet opening through the cylinder block;
    a plurality of support posts extending between a floor and a ceiling of the intake chamber; and
    an airflow diffusing structure adjacent to each of the at least one air inlet opening, the airflow diffusing structure located in the open intake chamber;
    wherein the airflow diffusing structure comprises inlet apertures that vary in either number or size along a length of the airflow diffusing structure.

12. The open intake chamber of claim 11, wherein the inlet apertures are grouped.

13. The open intake chamber of claim 12, wherein the inlet apertures are all of the same dimension along the length of the airflow diffusing structure, and further wherein the number of inlet apertures varies in each group of inlet apertures along the length of the airflow diffusing structure.

14. The open intake chamber of claim 12, wherein each group of inlet apertures has a constant number of inlet apertures along the length of the airflow diffusing structure, while a dimension of the inlet apertures in each group of inlet apertures varies along the length of the airflow diffusing structure.

15. A cylinder block for an uniflow-scavenged, two-stroke opposed-piston engine comprising:
    a plurality of cylinders in an in-line configuration, each cylinder having an intake port longitudinally separated from an exhaust port;
    an open intake chamber in the cylinder block including at least one air inlet opening through the cylinder block;
    all of the cylinder intake ports being contained in the open intake chamber to receive charge air therein; and,
    an airflow diffusing structure positioned at the air inlet opening to cause airflow entering into the intake chamber to spread out across the open intake chamber;
    wherein the airflow diffusing structure comprises apertures that vary in either number or size along a length of the airflow diffusing structure.

16. The cylinder block of claim 15, wherein the apertures are grouped such that an open surface area of the airflow diffusing structure varies from an end of the airflow diffusing structure closest to the air inlet opening to another end furthest from the air inlet opening.

17. The cylinder block of claim 16, wherein the apertures are all of the same dimension along the length of the airflow diffusing structure, and further wherein each group of apertures has a different number of apertures along the length of the airflow diffusing structure.

18. The cylinder block of claim 16, wherein each group of apertures has a constant number of apertures along the length of the airflow diffusing structure, while dimensions of the apertures in each group of apertures vary along the length of the airflow diffusing structure.

19. The cylinder block of claim 15, wherein the cylinder block is configured for a parent bore engine, further wherein the airflow diffusing structure is a diffusing screen that is a cast feature in the open intake chamber.

20. The cylinder block of claim 15, wherein the cylinder block is configured with a plurality of cylinder liners, further wherein the airflow diffusing structure is a plate that is fabricated separately from the cylinder block and inserted into the open intake chamber when the opposed-piston engine is assembled.

21. The cylinder block of claim 20, wherein the airflow diffusing structure is a plate that is fabricated from a material that differs from that of the cylinder block.

22. The cylinder block of claim 20, wherein the airflow diffusing structure is a plate that is fabricated from a material that is the same as that of the cylinder block.

23. A method of constructing an uniflow-scavenged, two-stroke opposed-piston engine comprising fabricating an open intake chamber in a cylinder block, in which the open intake chamber comprises an airflow diffusing structure with apertures that vary in either number or size along a length of the airflow diffusing structure.

24. The method of claim 23 further comprising casting a parent bore engine comprising the cylinder block.

25. The method of claim 24, further comprising casting the airflow diffusing structure as a diffusing screen within the open intake chamber in the cylinder block.

26. The method of claim 23, further comprising:
fabricating the airflow diffusing structure as a plate; and
inserting the plate into the open intake chamber when assembling the opposed-piston engine.

27. The method of claim 23, further comprising:
casting the airflow diffusing structure as a diffusing screen that is a cast feature in a component that is attached to the cylinder block; and
attaching the component to the cylinder block so that the airflow diffusing structure is in the open intake chamber.

28. A method for operating an uniflow-scavenged, two-stroke opposed-piston engine, comprising the cylinder block of claim 15, the method comprising:
flowing charge air from an air handling system into the open intake chamber over and through the airflow diffusing structure; and
supplying an equal amount of charge airflow to each intake port of cylinders disposed in the open intake chamber.

* * * * *